(12) United States Patent
Hashimoto et al.

(10) Patent No.: US 11,441,003 B2
(45) Date of Patent: Sep. 13, 2022

(54) THREE-DIMENSIONAL OBJECT PRECURSOR TREATMENT COMPOSITION

(71) Applicant: KAO CORPORATION, Tokyo (JP)

(72) Inventors: Ryouichi Hashimoto, Iwade (JP); Eiji Kashihara, Wakayama (JP)

(73) Assignee: KAO CORPORATION, Tokyo (JP)

( * ) Notice: Subject to any disclaimer, the term of this patent is extended or adjusted under 35 U.S.C. 154(b) by 872 days.

(21) Appl. No.: 16/302,291

(22) PCT Filed: May 17, 2016

(86) PCT No.: PCT/JP2016/064561
§ 371 (c)(1),
(2) Date: Nov. 16, 2018

(87) PCT Pub. No.: WO2017/199324
PCT Pub. Date: Nov. 23, 2017

(65) Prior Publication Data
US 2019/0185634 A1 Jun. 20, 2019

(51) Int. Cl.
*B29C 64/118* (2017.01)
*C08J 7/12* (2006.01)
(Continued)

(52) U.S. Cl.
CPC ............... *C08J 7/12* (2013.01); *B29C 64/118* (2017.08); *B29C 64/30* (2017.08); *B29C 67/00* (2013.01);
(Continued)

(58) Field of Classification Search
None
See application file for complete search history.

(56) References Cited

U.S. PATENT DOCUMENTS

2003/0059708 A1  3/2003  Yamamura et al.
2004/0106692 A1  6/2004  Yamauma et al.
(Continued)

FOREIGN PATENT DOCUMENTS

JP    2001-354996 A    12/2001
JP    2008-507619 A    3/2008
(Continued)

OTHER PUBLICATIONS

English translation of the Chinese Search Report, dated May 21, 2020, for Chinese Application No. 201680085776.5.
(Continued)

*Primary Examiner* — Monica A Huson
*Assistant Examiner* — Kelsey C Grace
(74) *Attorney, Agent, or Firm* — Birch, Stewart, Kolasch & Birch, LLP (57) ABSTRACT

The present invention is a composition of an agent for treating a precursor of a three-dimensional object for removing a support material from the precursor of the three-dimensional object containing a three-dimensional object and the support material containing a (meth)acrylic acid-based copolymer having a hydrophilic monomer and a hydrophobic monomer as a monomer unit; the composition of the agent for treating the precursor of the three-dimensional object having at least one or more type of organic amine compounds selected from the group consisting of a secondary monoamine compound, a tertiary monoamine compound, a secondary diamine compound, and a tertiary diamine compound; in which a total content of alkali metal hydroxide and alkali metal carbonate is less than a content of the organic amine compound and less than 2.5% by mass. The present invention can provide a composition of an agent for treating a precursor of a three-dimensional object that is capable of removing the support material containing a
(Continued)

(meth)acrylic acid-based copolymer more quickly than before.

10 Claims, 1 Drawing Sheet

(51) Int. Cl.
  *B33Y 70/00* (2020.01)
  *B29C 67/00* (2017.01)
  *B33Y 10/00* (2015.01)
  *B33Y 40/00* (2020.01)
  *B29C 64/30* (2017.01)

(52) U.S. Cl.
  CPC .............. *B33Y 10/00* (2014.12); *B33Y 40/00* (2014.12); *B33Y 70/00* (2014.12); *C08J 2333/02* (2013.01)

(56) References Cited

U.S. PATENT DOCUMENTS

| | | | |
|---|---|---|---|
| 2017/0232684 A1* | 8/2017 | Yoshimura | ............... C08L 1/02 264/308 |
| 2017/0240675 A1 | 8/2017 | Yoshimura et al. | |

FOREIGN PATENT DOCUMENTS

| | | |
|---|---|---|
| JP | 2012-52024 A | 3/2012 |
| JP | 2014-83744 A | 5/2014 |
| JP | 2016-78284 A | 5/2016 |
| WO | WO 2006/020279 A2 | 2/2006 |
| WO | WO 2016/059987 A1 | 4/2016 |

OTHER PUBLICATIONS

Extended European Search Report, dated Jan. 14, 2020, for European Application No. 16902344.7.
Schmidt, "Amine—Römmp, Thiem", Aug. 1, 2008, url: https://roempp.thieme.de/roempp4.0/do/data/RD-01-01977, 5 pages.
Taiwanese Search Report dated Sep. 29, 2020 for Application No. 106115579.
International Preliminary Report on Patentability and an English translation of the Written Opinion of the International Searching Authority issued in the corresponding International Application No. PCT/JP2016/064561 dated Nov. 29, 2018.
International Search Report (PCT/ISA/210) issued in PCT/JP2016/064561, dated Jun. 14, 2016.

* cited by examiner

THREE-DIMENSIONAL OBJECT PRECURSOR TREATMENT COMPOSITION

TECHNICAL FIELD

The present invention relates to a composition of an agent for treating a precursor of a three-dimensional object.

BACKGROUND ART

The 3D printer is one type of rapid prototyping, and it is a three-dimensional printer for modeling a three-dimensional object based on 3D data such as 3D CAD and 3D CG. Systems of 3D printing have been known, such as a fused deposition modeling system (hereinafter referred to as an FDM system), an inkjet ultraviolet curing system, a stereolithography system, and a selective laser sintering system. Among these systems, the FDM system is a modeling system of heat-melting, extruding, and laminating polymer filaments to obtain a three-dimensional object, and the FDM system does not use a reaction of the material unlike other systems. Accordingly, a 3D printer of an FDM system is small and inexpensive, and has become popular in recent years as an apparatus with less post-processing. In order to model a three-dimensional object having a more complex shape in a FDM system, a modeling material constituting the three-dimensional object and a support material for supporting a three-dimensional structure of the modeling material are laminated to obtain a precursor of the three-dimensional object, and then the support material is removed from the precursor of the three-dimensional object to obtain the target three-dimensional object.

An example of a method for removing the support material from the precursor of the three-dimensional object includes a method of using a (meth)acrylic acid-based copolymer as the support material and soaking the precursor of the three-dimensional object in an agent for treating the precursor of the three-dimensional object containing alkali to remove the support material (for example, JP-T-2008-507619 and JP-A-2014-83744). This method uses carboxylic acid in the (meth)acrylic acid-based copolymer being neutralized by alkalis and dissolved into an alkaline aqueous solution. The (meth)acrylic acid-based copolymer contained in the support material used in this method has a hydrophobic group from the viewpoints of heat-melting, extruding, and laminating property by a 3D printer. The (meth)acrylic acid-based copolymer also has a hydrophilic group from the viewpoint of solubility into the agent for treating the precursor of the three-dimensional object.

SUMMARY OF THE INVENTION

The composition of the agent for treating the precursor of the three-dimensional object according to the present invention is the composition of the agent for treating the precursor of the three-dimensional object for removing the support material from a precursor of the three-dimensional object containing a three-dimensional object and a support material containing a (meth)acrylic acid-based copolymer having a hydrophilic monomer and a hydrophobic monomer as a monomer unit. The composition of the agent for treating the precursor of the three-dimensional object contains at least one or more type of the organic amine compounds selected from the group consisting of a secondary monoamine compound, a tertiary monoamine compound, a secondary diamine compound, and a tertiary diamine compound; and the total content of alkali metal hydroxide and alkali metal carbonate is less than the content of the organic amine compound and less than 2.5% by mass.

The method for manufacturing a three-dimensional object according to the present invention is a method for manufacturing a three-dimensional object by a fused deposition modeling system having a modeling step for obtaining a precursor of the three-dimensional object containing a three-dimensional object and a support material and a support material removing step of contacting the precursor of the three-dimensional object to the composition of the agent for treating the precursor of the three-dimensional object to remove the support material.

SUMMARY OF THE INVENTION

Figure 1:
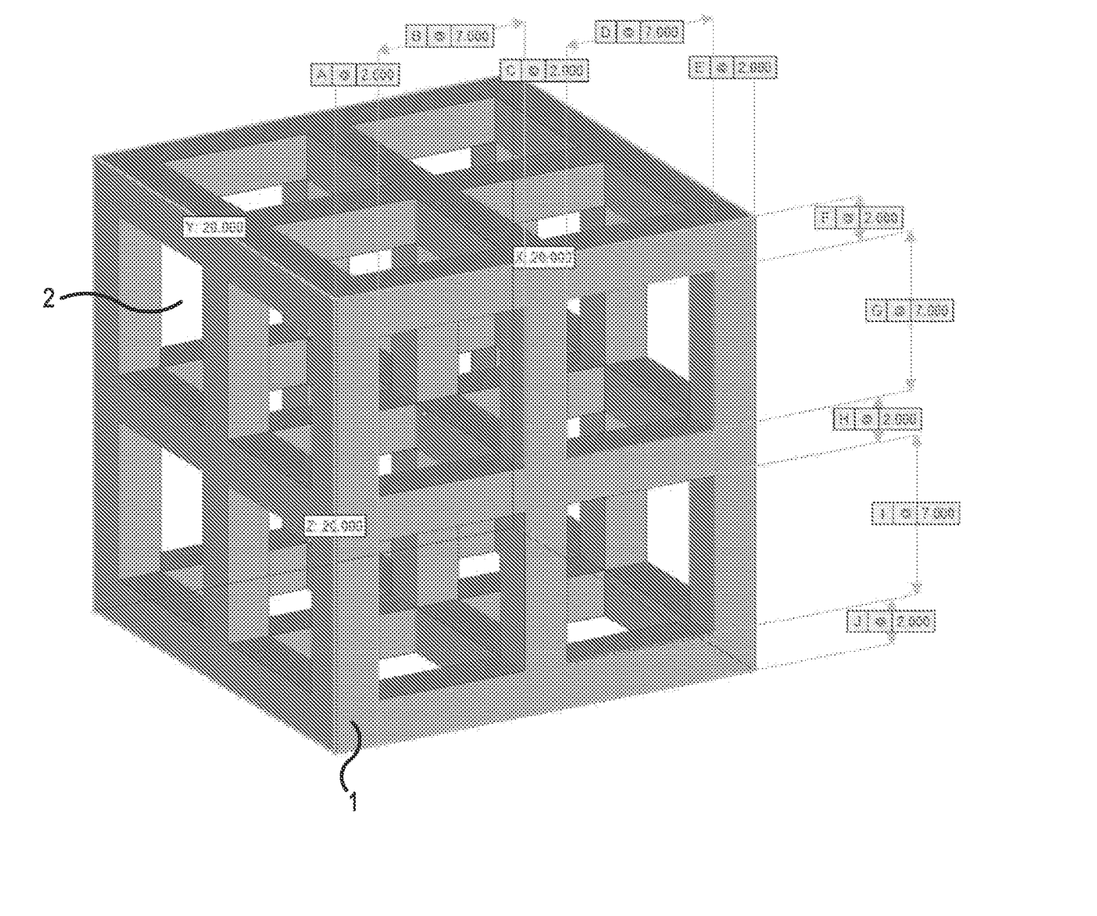
The FIGURE is a schematic drawing showing a shape of the evaluation sample used in the example.

When a conventional agent for treating a precursor of a three-dimensional object is used, it takes time to remove a support material containing a (meth)acrylic acid-based copolymer having a hydrophilic group and a hydrophobic group. In order to solve this problem, an alkali concentration in the agent for treating the precursor of the three-dimensional object is increased or the temperature when the precursor of the three-dimensional object is soaked into the agent for treating the precursor of the three-dimensional object is increased to enhance the reactivity.

However, it was found that the support material is swollen and the swollen support material cannot be removed quickly if the reactivity is enhanced by increasing an alkali concentration in the agent for treating the precursor of the three-dimensional object or increasing the temperature when the precursor of the three-dimensional object is soaked into the agent for treating the precursor of the three-dimensional object.

The present invention provides a composition of an agent for treating a precursor of the three-dimensional object that is capable of removing the support material containing a (meth)acrylic acid-based copolymer more quickly than before and a method for manufacturing a three-dimensional object by a fused deposition modeling system using the composition of the agent for treating the precursor of the three-dimensional object.

The composition of the agent for treating the precursor of the three-dimensional object according to the present invention is the composition of the agent for treating the precursor of the three-dimensional object for removing the support material from a precursor of the three-dimensional object containing a three-dimensional object and a support material containing a (meth)acrylic acid-based copolymer having a hydrophilic monomer and a hydrophobic monomer as a monomer unit. The composition of the agent for treating the precursor of the three-dimensional object contains at least one or more type of the organic amine compounds selected from the group consisting of a secondary monoamine compound, a tertiary monoamine compound, a secondary diamine compound, and a tertiary diamine compound; and the total content of alkali metal hydroxide and alkali metal carbonate is less than the content of the organic amine compound and less than 2.5% by mass.

The method for manufacturing a three-dimensional object according to the present invention is a method for manufacturing a three-dimensional object by a fused deposition modeling system having a modeling step for obtaining a precursor of the three-dimensional object containing a three-dimensional object and a support material and a support material removing step of contacting the precursor of the three-dimensional object to the composition of the agent for treating the precursor of the three-dimensional object to remove the support material.

According to the present invention, a composition of the agent for treating the precursor of the three-dimensional object can be provided that is capable of removing the support material containing a (meth)acrylic acid-based copolymer more quickly than before, and a method for manufacturing a three-dimensional object by a fused deposition modeling system can be provided using the composition of the agent for treating the precursor of the three-dimensional object.

One of the embodiments of the present invention will be described below.

<Composition of Agent for Treating Precursor of Three-Dimensional Object>

The composition of the agent for treating the precursor of the three-dimensional object according to the present embodiment is the composition of the agent for treating the precursor of the three-dimensional object for removing the support material from a precursor of the three-dimensional object containing a three-dimensional object and a support material containing a (meth)acrylic acid-based copolymer having a hydrophilic monomer and a hydrophobic monomer as a monomer unit. The composition of the agent for treating the precursor of the three-dimensional object contains at least one or more type of the organic amine compounds selected from the group consisting of a secondary monoamine compound, a tertiary monoamine compound, a secondary diamine compound, and a tertiary diamine compound; and the total content of alkali metal hydroxide and alkali metal carbonate is less than the content of the organic amine compound and less than 2.5% by mass.

As described above, the support material is swollen and the swollen support material cannot be removed quickly if the reactivity is enhanced by increasing an alkali concentration in the agent for treating the precursor of the three-dimensional object or increasing a temperature when the precursor of the three-dimensional object is soaked into the agent for treating the precursor of the three-dimensional object. It has been considered that a (meth)acrylic acid-based copolymer having a hydrophilic group and a hydrophobic group contained in the support material and alkali metal hydroxide and alkali metal carbonate contained in the conventional composition of the agent for treating the precursor of the three-dimensional object are the most effective components for removing the support material. However, it was found that the removal of the support material is inhibited by the alkali metal salts swollen by absorbing water. The composition of the agent for treating the precursor of the three-dimensional object according to the present embodiment contains at least one or more type of the organic amine compounds selected from the group consisting of a secondary monoamine compound, a tertiary monoamine compound, a secondary diamine compound, and a tertiary diamine compound; and the content of alkali metal hydroxide and alkali metal carbonate which have been considered as the most effective basic components for removing the support material is made to be a certain amount or less to suppress the swelling of the (meth)acrylic acid-based copolymer and remove the support material containing the (meth)acrylic acid-based copolymer more quickly than before.

<Organic Amine Compound>

The organic amine compounds are at least one or more type selected from the group consisting of a secondary monoamine compound, a tertiary monoamine compound, a secondary diamine compound, and a tertiary diamine compound.

At least one of the two amino groups in the diamine compound is secondary or tertiary. This means that the diamine compound may have primary amine in the molecular for example. However, the ratio of the primary amine in the diamine compound is preferably small from a viewpoint of suppressing the swelling of the (meth)acrylic acid-based copolymer.

Examples of the secondary monoamine compound include methylethanolamine, ethylethanolamine, diisopropanolamine, diisopropylamine, diethanolamine, butylethanolamine, dimethylamine, diethylamine, dipropylamine, dibutylamine, methylethylamine, methylpropylamine, methylbutylamine, methylhexylamine, dipentylamine, piperidine, morpholine, and 2,6-dimethylmorpholine. Among these, the secondary monoamine compound is preferably one or more type selected from the group consisting of methylethanolamine, ethylethanolamine, diisopropanolamine, butylethanolamine, and diisopropylamine from a viewpoint of suppressing the swelling of the (meth)acrylic acid-based copolymer to exhibit excellent removability of the support material.

Examples of the tertiary monoamine compound include trimethylamine, triethylamine, dimethylethylamine, diethylmethylamine, tripropylamine, tributylamine, tripentylamine, triethanolamine, hydroxyethylpiperazine, dimethylaminoethanol, diethylaminoethanol, N-tert-butyldiethanolamine, dimethylaminoethoxyethanol (trade name: KL-26 manufactured by Kao Corporation), ethyldiethanolamine, butyldiethanolamine, 6-dimethylamino-1-hexanol (trade name: KL-25 manufactured by Kao Corporation), 5-(dimethylamino)-2-pentanol, 5-(dimethylamino)-1-pentanol, 3-(diethylamino)-1-propanol, N-methylmorpholine, N-ethylmorpholine, and 4-(2-hydroxyethyl)morpholine. Among these, the tertiary monoamine compound is preferably one or more type selected from the group consisting of dimethylaminoethanol, diethylaminoethanol, N-tert-butyldiethanolamine, dimethylaminoethoxyethanol, ethyldiethanolamine, and 6-dimethylamino-1-hexanol; and 6-dimethylamino-1-hexanol is more preferable from a viewpoint of suppressing the swelling of the (meth)acrylic acid-based copolymer to exhibit excellent removability of the support material.

Examples of the secondary diamine compound include piperazine and hydroxyethylpiperazine. Among these, hydroxyethylpiperazine is preferable from a viewpoint of suppressing the swelling of the (meth)acrylic acid-based copolymer to exhibit excellent removability of the support material.

Examples of the tertiary diamine compound include tetraethylhexanediamine, tetramethylhexanediamine (trade name: KL-1 manufactured by Kao Corporation), tetramethylpropanediamine (trade name: KL-2 manufactured by Kao Corporation), (2-dimethylaminoethyl)methylethanolamine (trade name: KL-28 manufactured by Kao Corporation), tetramethylethylenediamine, dipiperidinoethane, dipyrrolidinoethane, sparteine, and trimethylaminopropylethanolamine. Among these, the tertiary diamine compound is preferably one or more type selected from the group consisting of tetramethylhexanediamine, tetramethylpropanediamine, and (2-dimethylaminoethyl)methylethanolamine from a viewpoint of suppressing the swelling of the (meth) acrylic acid-based copolymer to exhibit excellent removability of the support material.

Among these organic amine compounds, the organic amine compound is preferably one or more type selected from the group consisting of a secondary monoamine compound and a tertiary monoamine compound from a viewpoint of suppressing the swelling of the (meth)acrylic acid-based copolymer to exhibit excellent removability of the support material.

Among these organic amine compounds, a amine compound having an alcoholic hydroxy group is preferable from a viewpoint of suppressing the swelling of the (meth)acrylic acid-based copolymer and giving quick dispersion into a washing liquid to exhibit excellent removability of the support material.

Among these organic amine compounds, the number of carbon atoms in the hydrocarbon part in the amine compound is preferably 4 or more and more preferably 6 or more from a viewpoint of suppressing the swelling of the (meth) acrylic acid-based copolymer and giving quick dispersion into a washing liquid to exhibit excellent removability of the support material.

The content of the organic amine compound in the composition of the agent for treating the precursor of the three-dimensional object is preferably 0.5% by mass or more and more preferably 1.0% by mass or more from a viewpoint of suppressing the swelling of the (meth)acrylic acid-based copolymer to exhibit excellent removability of the support material. The content of the organic amine compound in the composition of the agent for treating the precursor of the three-dimensional object is preferably 20% by mass or less, more preferably 15% by mass or less, and further preferably 10% by mass or less from a viewpoint of suppressing the swelling of the (meth)acrylic acid-based copolymer to exhibit excellent removability of the support material. If all of these viewpoints are considered, the content of the organic amine compound in the composition of the agent for treating the precursor of the three-dimensional object is preferably 0.5% by mass to 20% by mass, more preferably 1.0% by mass to 15% by mass, and further preferably 1.0% by mass to 10% by mass.

[Alkali Metal Hydroxide and Alkali Metal Carbonate]

Examples of the alkali metal hydroxide include lithium hydroxide, sodium hydroxide, and potassium hydroxide.

Examples of the alkali metal carbonate include lithium carbonate, sodium carbonate, and potassium carbonate.

The total content of the alkali metal hydroxide and the alkali metal carbonate in the composition of the agent for treating the precursor of the three-dimensional object is desirably less than the content of the organic amine compound from a viewpoint of quickly removing the support material from the precursor of the three-dimensional object to suppress the swelling. The ratio of the content of the organic amine compound to the total content of the alkali metal hydroxide and the alkali metal carbonate ((Content of the organic amine compound)/(Total content of the alkali metal hydroxide and the alkali metal carbonate)) is preferably less than 0.33, more preferably less than 0.25, further preferably less than 0.20; and preferably 0 or more and more preferably 0.01 or more.

The total content of the alkali metal hydroxide and the alkali metal carbonate in the composition of the agent for treating the precursor of the three-dimensional object is less than 2.5% by mass, preferably less than 2.0% by mass, more preferably less than 1.0% by mass, further preferably less than 0.5% by mass; and preferably 0% by mass or more, more preferably 0.01% by mass or more, and further preferably 0.25% by mass or more from the viewpoints of quickly removing the support material from the precursor of the three-dimensional object and suppressing a pH decrease due to repetitive use to maintain excellent removability for a long period of time.

[Surfactant]

The composition of the agent for treating the precursor of the three-dimensional object can contain a surfactant. If the composition of the agent for treating the precursor of the three-dimensional object contains a surfactant, a support material stuck in the spaces in the three-dimensional object can be removed quickly and the swelling of the (meth) acrylic acid-based copolymer is suppressed to maintain excellent removability of the support material for a long period of time.

Examples of the surfactant include a nonion surfactant, an amphoteric surfactant, and an anion surfactant.

Examples of the anion surfactant include alkylbenzene sulfonate, alkyl or alkenylether sulfate, alkyl or alkenyl sulfate, olefin sulfonate, alkane sulfonate, a saturated or unsaturated fatty acid salt, alkyl or alkanylether carboxylate, an α-sulfofatty acid salt, an N-acylamino acid salt, phosphoric monoester or diester, and sulfosuccinic ester. An example of the alkylether sulfate includes a polyoxyethylene alkylether sulfate. Among these, at least one or more type of the anionic surfactants selected from the group consisting of alkyl sulfate, alkylether sulfate, a saturated fatty acid salt, and alkylether carboxylate are preferable. Examples of the counter ions of the anionic group of the anionic surfactant include an alkaline metal ion such as a sodium ion and a potassium ion; an alkaline earth metal ion such as a calcium ion and a magnesium ion; an ammonium ion; and an alkanolamine salt having 1 or more and 3 or less alkanol groups having 2 or 3 carbon atoms such as a monoethanol amine salt, a diethanol amine salt, a triethanol amine salt, and a triisopropanol amine salt.

Examples of the amphoteric surfactant include imidazoline, carbobetaine, amidobetaine, sulfobetaine, hydroxysulfobetaine, and amidosulfobetaine; and a betaine surfactant such as alkyldimethylaminoacetic acid betaine and fatty acid amidopropylbetaine are more preferable; and fatty acid amidopropylbetaine is further preferable.

Examples of the nonion surfactant include polyoxyalkylenealkylether, polyoxyalkylenealkenylether, polyoxyethylene distyrenated phenylether, higher fatty acid sucrose ester, polyglycerol fatty acid ester, higher fatty acid monoethanolamido or diethanolamido, polyoxyethylene hydrogenated castor oil, polyoxyethylene sorbitan fatty acid ester, polyoxyethylene sorbitol fatty acid ester, alkylsaccharide, alkylamine oxide, and alkylamidoamine oxide. Among these, at least one or more type of noionic surfactants selected from the group consisting of polyoxyalkylenealkylether and polyoxyethylene distyrenated phenylether are preferable; and polyoxyethylenealkylether is more preferable.

The polyoxyalkylenealkylether is preferably polyoxyalkylenealkylether represented by the following formula (1) from a viewpoint of quickly removing the support material stuck in the spaces in the three-dimensional object and a viewpoint of suppressing the swelling of the (meth)acrylic acid-based copolymer to maintain excellent removability of the support material for a long period of time.

$$R^1\text{—O-(EO)}_m(\text{PO})_p\text{—H} \quad (1)$$

(In the formula (1), $R^1$ represents an alkyl group having 4 to 18 carbon atoms, EO represents an oxyethylene group, PO represents an oxypropylene group, m and p represent average addition mole numbers of EO and PO respectively, m is an integer of 1 to 20, and p is an integer of 0 to 20.)

The number of the carbon atoms of the alkyl group represented by $R^1$ is preferably 4 or more, more preferably 6 or more, and further preferably 8 or more from a viewpoint of quickly removing the support material stuck in the spaces in the three-dimensional object and a viewpoint of maintaining excellent removability of the support material for a long period of time. The number of the carbon atoms of the alkyl group represented by $R^1$ is preferably 18 or less, more preferably 16 or less, and further preferably 12 or less from the viewpoints of detergency for removing the support material from the spaces and durability of a removing liquid. If all of these viewpoints are considered, the number of the carbon atoms of the alkyl group represented by $R^1$ is preferably 4 to 18, more preferably 6 to 16, and further preferably 8 to 12.

$(EO)_m(PO)_p$ may consist of an oxyethylene group alone (p=0). However, $(EO)_m(PO)_p$ may consist of an oxyethylene group and an oxypropylene group. If the $(EO)_m(PO)_p$ consists of an oxyethylene group and an oxypropylene group, the sequence of EO and PO may be block or random. If the sequence of EO and PC is block, each of the numbers of EO and PO in the block may be 1 or 2 or more as long as each of the average addition mole numbers is within the above-described range. If the number of the blocks consisting of EO is 2 or more, the number of EO in the block may be the same or different from each other. If the number of the blocks consisting of PO is 2 or more, the number of PO in the block may be the same or different from each other.

m is preferably 2 or more and more preferably 4 or more from a viewpoint of quickly removing the support material stuck in the spaces in the three-dimensional object and a viewpoint of maintaining excellent removability of the support material for a long period of time. m is preferably 20 or less, more preferably 15 or less, and further preferably 10 or less from a viewpoint of suppressing foaming. If all of these viewpoints are considered, m is preferably 2 to 20, more preferably 2 to 15, and further preferably 4 to 12.

p is preferably 3 or less, more preferably 2 or less, and further preferably 1 or less from a viewpoint of quickly removing the support material stuck in the spaces in the three-dimensional object and a viewpoint of maintaining excellent removability of the support material for a long period of time.

The content of the surfactant is preferably 10% by mass or less and more preferably 5% by mass or less in the composition of the agent for treating the precursor of the three-dimensional object from a viewpoint of quickly removing the support material stuck in the spaces in the three-dimensional object and a viewpoint of maintaining excellent removability of the support material for a long period of time.

[Others]

The composition of the agent for treating the precursor of the three-dimensional object may contain water; a water-soluble organic solvent; a builder such as ethylenediaminetetraacetate, carboxymethyl cellulose, polyvinylpyrrolidone, polyacrylate, and an arginine acid salt; a thicker; a pH regulator; a preservative; an antirust agent; a pigment; and a coloring agent. Because the color of the treatment composition containing a coloring agent changes depending on the type of the support material when the support material dissolves in the treatment composition, the coloring agent is expected to have a function as an indicator indicating progress and finish time of the treatment.

[Water]

Examples of the water include super pure water, pure water, ion exchanged water, distilled water, and tap water. The content of the water may be a remaining portion of the composition of the agent for treating the precursor of the three-dimensional object (the total amount is 100% by mass). The content of the water in the composition of the agent for treating the precursor of the three-dimensional object is preferably 20% by mass or more, more preferably 40% by mass or more, and further preferably 60% by mass or more from the viewpoints of improving the stability and the handleability of the treatment composition and improving the performance of treating waste liquid for environmental consideration. The content of the water in the composition of the agent for treating the precursor of the three-dimensional object is preferably 99% by mass or less, more preferably 98% by mass or less, and further preferably 97% by mass or less from the viewpoints of improving the stability and the handleability of the treatment composition and improving the performance of treating waste liquid for environmental consideration.

[Water-Soluble Organic Solvent]

The water-soluble organic solvent exhibits the performance of breaking the support material and dissolving the support material into the developer treatment composition.

The water-soluble organic solvent preferably has solubility of 1.5% by mass or more into water at 20° C. An example of the water-soluble organic solvent includes a water-soluble organic solvent selected from monovalent alcohol, polyvalent alcohol, and glycolether.

An example of the monovalent alcohol includes monovalent alcohol having 1 or more and 5 or less of carbon atoms. Specific examples of the monovalent alcohol include monovalent alcohol selected from methyl alcohol, ethyl alcohol, 1-propyl alcohol, isopropyl alcohol, allyl alcohol, n-butyl alcohol, isobutyl alcohol, sec-butyl alcohol, t-butyl alcohol, and amyl alcohol.

An example of the polyvalent alcohol includes alkylene glycol with a repeating unit having 2 or more and 3 or less of carbon atoms (which is referred to C2-C3 alkylene glycol below). Examples of the C2-C3 alkylene glycol include ethylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, propylene glycol, dipropylene glycol, and tripropylene glycol. The C2-C3 alkylene glycol preferably has 1 or more and 10 or less of oxyethylene groups or oxypropylene groups which are the repeating unit of the C2-C3 alkylene glycol.

An example of the polyvalent alcohol other than the C2-C3 alkylene glycol includes polyvalent alcohol having 2 or more and 8 or less of carbon atoms. Specific examples of the polyvalent alcohol other than the C2-C3 alkylene glycol include trimethylene glycol, 1,3-octylene glycol, 1,2-propane diol, 1,3-propane diol, 2-methyl-1,3-propane diol, 1,2-butane diol, 1,3-butane diol, 1,4-butane diol, 1,4-butene diol, 1,4-pentane diol, 1,5-pentane diol, 1,5-hexane diol, 1,6-hexane diol, glycerin, trimethylolethane, and trimethylolpropane.

An example of the glycolether includes glycolether selected from polyoxyalkylene monoalkylether and polyoxyalkylene dialkylether. The oxyalkylene group in the glycolether is preferably an oxyethylene group. The average addition mole number of the oxyalkylene group is preferably 1 or more and 7 or less. The number of the carbon atoms in the alkyl group (the alkyl group of the end ether part) is preferably 1 or more and 4 or less. Specific examples include POE (1 or more and 7 or less) monomethylether, POE (1 or more and 7 or less) monoethylether, POE (1 or more and 7 or less) monopropylether, POE (1 or more and 7 or less)

monobutylether, POE (1 or more and 7 or less) monoisobutylether, POE (1 or more and 7 or less) monoallylether, POE (1 or more and 7 or less) monohexylether, POE (1 or more and 7 or less) dimethylether, POE (1 or more and 7 or less) diethylether, POE (1 or more and 7 or less) dipropylether, and POE (1 or more and 7 or less) dibutylether. POE is an abbreviation of polyoxyethylene, and the number in the parenthesis is the average addition mole number of ethylene oxide (same applies hereafter).

The water-soluble organic solvents may be used either alone or in combination of two or more types. Among those, the water-soluble organic solvents selected from methyl alcohol, ethyl alcohol, 1-propyl alcohol, isopropyl alcohol, t-butyl alcohol, ethylene glycol, diethylene glycol, triethylene glycol, propylene glycol, dipropylene glycol, tripropylene glycol, POE (1 or more and 5 or less) monomethylether, POE (1 or more and 5 or less) monoethylether, POE (1 or more and 5 or less) monopropylether, POE (1 or more and 5 or less) monobutylether, POE (1 or more and 5 or less) monoisobutylether, POE (2 or more and 5 or less) dimethylether, and POE (2 or more and 5 or less) diethylether are preferable from the viewpoints of further improving the performances of breaking the support material and dissolving the support material into the treatment composition; and the water-soluble organic solvents selected from ethyl alcohol, ethylene glycol, diethylene glycol, triethylene glycol, propylene glycol, dipropylene glycol, POE (1 or more and 3 or less) monomethylether, POE (1 or more and 3 or less) monoethylether, POE (1 or more and 3 or less) monopropylether, POE (1 or more and 3 or less) monobutylether, and POE (1 or more and 3 or less) monoisobutylether are more preferable.

<Method for Manufacturing Three-Dimensional Object>

The method for manufacturing the three-dimensional object according to the present embodiment is a method for manufacturing the three-dimensional object by a fused deposition modeling system having a modeling step of obtaining a precursor of the three-dimensional object containing a three-dimensional object and a support material containing a (meth)acrylic acid-based copolymer having a hydrophilic monomer and a hydrophobic monomer as a monomer unit and a removing step of contacting the precursor of the three-dimensional object to the composition of the agent for treating the precursor of the three-dimensional object to remove the support material. The method for manufacturing the three-dimensional object according to the present embodiment is capable of removing the support material containing a (meth)acrylic acid-based copolymer more quickly than before. It is considered that the reasons for the method for manufacturing the three-dimensional object to have such effects are the same reasons for the composition of the agent for treating the precursor of the three-dimensional object to have the above-described effects.

[Modeling Step]

A step of obtaining a precursor of the three-dimensional object containing a three-dimensional object and a support material in the method for manufacturing the three-dimensional object by a 3D printer of a conventional fused deposition modeling system can be used as the modeling step of obtaining a precursor of the three-dimensional object containing a three-dimensional object and a support material containing a (meth)acrylic acid-based copolymer having a hydrophilic monomer and a hydrophobic monomer as a monomer unit.

Any modeling material that is a raw material of the three-dimensional object may be used with no specific restriction as long as the modeling material is a resin that can be used as the modeling material in the method for manufacturing the three-dimensional object by a conventional FDM system. An example of the modeling material is a thermoplastic resin such as an ABS resin, a polylactic acid resin, a polycarbonate resin, and polyphenylsulfone resin. Among these, the ABS resin and/or the polylactic acid resin are more preferable and the ABS resin is further preferable from a viewpoint of the modeling properties by a 3D printer.

The soluble material for three-dimensional modeling that is a material for the support material contains a (meth)acrylic acid-based copolymer having a hydrophilic monomer and a hydrophobic monomer as a monomer unit.

[(Meth)acrylic Acid-Based Copolymer]

(Hydrophilic Monomer)

Examples of the hydrophilic monomer include acrylic acid, methacrylic acid, diethylaminoethyl acrylate, 2-hydroxyethyl acrylate, 2-hydroxypropyl acrylate, glycidyl acrylate, tetrahydrofurfuryl acrylate, diethylaminoethyl methacrylate, 2-hydroxyethyl methacrylate, 2-hydroxypropyl methacrylate, glycidyl methacrylate, tetrahydrofurfuryl methacrylate, itaconic acid, maleic acid, fumaric acid, and α-hydroxy acrylate. Among these, one or more type of the hydrophilic monomers selected from the group consisting of acrylic acid and methacrylic acid is preferable from a viewpoint of the removability of the support material.

(Hydrophobic Monomer)

Examples of the hydrophobic monomer include methylacrylate, ethylacrylate, propylacrylate, butylacrylate, isobutylacrylate, tertiary butylacrylate, 2-ethylhexylacrylate, octylacrylate, isodecylacrylate, laurylacrylate, tridecylacrylate, cetylacrylate, stearylacrylate, cyclohexylacrylate, benzylacrylate, methylmethacrylate, ethylmethacrylate, propylmethacrylate, butylmethacrylate, isobutylmethacrylate, tertiary butylmethacrylate, 2-ethylhexylmethacrylate, octylmethacrylate, isodecylmethacrylate, laurylmethacrylate, tridecylmethacrylate, cetylmethacrylate, stearylmethacrylate, cyclohexylmethacrylate, benzylmethacrylate, styrene, and α-methylene-γ-valerolactone.

The (meth)acrylic acid-based copolymer may contain a monomer unit other than the hydrophilic monomer and the hydrophobic monomer.

[Support Material Removing Step]

The support material removing step is a step of contacting the precursor of the three-dimensional object to the composition of the agent for treating the precursor of the three-dimensional object to remove the support material. It is considered that the method of contacting the precursor of the three-dimensional object to the composition of the agent for treating the precursor of the three-dimensional object is soaking the precursor in a treatment liquid and stirring, exposing the precursor to a strong water flow, or moving the precursor itself. However, the method of soaking the precursor of the three-dimensional object in the composition of the agent for treating the precursor of the three-dimensional object is preferable from a viewpoint of preventing the precursor from being damaged and a viewpoint of easiness of work. The precursor may be irradiated with ultrasonic waves while being soaked to accelerate dissolution of the support material from a viewpoint of improving the removability of the support material.

The pH of the composition of the agent for treating the precursor of the three-dimensional object is preferably 10 or more and more preferably 11 or more from a viewpoint of the solubility of the support material. The pH of the composition of the agent for treating the precursor of the three-dimensional object is preferably 14 or less and more preferably 13 or less from a viewpoint of suppressing or reducing damages to the modeling material. If all of these viewpoints are considered, the pH of the composition of the agent for treating the precursor of the three-dimensional object is preferably 10 to 14, more preferably 10 to 13, and further preferably 11 to 13.

The usage of the composition of the agent for treating the precursor of the three-dimensional object is preferably an amount of 10 or more mass times the amount of the support material and more preferably an amount of 20 or more mass times the amount of the support material from a viewpoint of the solubility of the support material. The usage of the composition of the agent for treating the precursor of the three-dimensional object is preferably an amount of 10,000 or less mass times the amount of the support material, more preferably an amount of 5,000 or less times the amount of the support material, further preferably an amount of 1,000 or less times the amount of the support material, and further more preferably an amount of 100 or less times the amount of the support material from a viewpoint of the workability.

The temperature of the composition of the agent for treating the precursor of the three-dimensional object in the support material removing step is preferably 25° C. or higher and more preferably 40° C. or higher from a viewpoint of the solubility of the support material. The temperature of the composition of the agent for treating the precursor of the three-dimensional object in the support material removing step is preferably 80° C. or lower and more preferably 70° C. or lower from the same viewpoint. If all of these viewpoints are considered, the temperature of the composition of the agent for treating the precursor of the three-dimensional object in the support material removing step is preferably 25° C. to 80° C. and more preferably 40° C. to 70° C.

The duration of contact between the support material for the three-dimensional modeling and the composition of the agent for treating the precursor of the three-dimensional object is preferably 5 minutes or more from a viewpoint of the removability of the support material. The duration of contact between the support material for the three-dimensional modeling and the composition of the agent for treating the precursor of the three-dimensional object is preferably 180 minutes or less, more preferably 120 minutes or less, further preferably 90 minutes or less, and further more preferably 60 minutes or less from a viewpoint of reducing damages to the three-dimensional object. If all of these viewpoints are considered, the duration of contact between the support material for the three-dimensional modeling and the composition of the agent for treating the precursor of the three-dimensional object is preferably 5 minutes to 180 minutes, more preferably 5 minutes to 120 minutes, further preferably 5 minutes to 90 minutes, and further more preferably 5 minutes to 60 minutes.

With respect to the above-described embodiment, the present description further discloses the following composition and manufacturing method.

<1> A composition of an agent for treating a precursor of a three-dimensional object for removing a support material from the precursor of the three-dimensional object containing a three-dimensional object and the support material containing a (meth)acrylic acid-based copolymer having a hydrophilic monomer and a hydrophobic monomer as a monomer unit; the composition of the agent for treating the precursor of the three-dimensional object comprising:

at least one or more type of organic amine compounds selected from the group consisting of a secondary monoamine compound, a tertiary monoamine compound, a secondary diamine compound, and a tertiary diamine compound; wherein a total content of alkali metal hydroxide and alkali metal carbonate is less than a content of the organic amine compound and less than 2.5% by mass.

<2> The composition of the agent for treating the precursor of the three-dimensional object according to <1>, wherein the secondary monoamine compound is preferably one or more type selected from the group consisting of methylethanolamine, ethylethanolamine, diisopropanolamine, diisopropylamine, diethanolamine, butylethanolamine, dimethylamine, diethylamine, dipropylamine, dibutylamine, methylethylamine, methylpropylamine, methylbutylamine, methylhexylamine, dipentylamine, piperidine, morpholine, and 2,6-dimethylmorpholine; and more preferably methylethanolamine, ethylethanolamine, diisopropanolamine, butylethanolamine, and diisopropylamine.

<3> The composition of the agent for treating the precursor of the three-dimensional object according to <1> or <2>, wherein the tertiary monoamine compound is preferably one or more type selected from the group consisting of trimethylamine, triethylamine, dimethylethylamine, diethylmethylamine, tripropylamine, tributylamine, tripentylamine, triethanolamine, hydroxyethylpiperazine, dimethylaminoethanol, diethylaminoethanol, N-tert-butyldiethanolamine, dimethylaminoethoxyethanol, ethyldiethanolamine, butyldiethanolamine, 6-dimethylamino-1-hexanol, 5-(dimethylamino)-2-pentailol, 5-(dimethylamino)-1-pentanol, 3-(diethylamino)-1-propanol, N-methylmorpholine, N-ethylmorpholine, and 4-(2-hydroxyethyl)morpholine; more preferably one or more type selected from the group consisting of dimethylaminoethanol, diethylaminoethanol, N-tert-butyldiethanolamine, dimethylaminoethoxyethanol, ethyldiethanolamine, and 6-dimethylamino-1-hexanol; and even more preferably 6-dimethylamino-1-hexanol.

<4> The composition of the agent for treating the precursor of the three-dimensional object according to any one of <1> to <3>, wherein the secondary diamine compound is preferably one or more type selected from the group consisting of piperazine and hydroxyethylpiperazine; and more preferably hydroxyethylpiperazine.

<5> The composition of the agent for treating the precursor of the three-dimensional object according to any one of <1> to <4>, wherein the tertiary diamine compound is preferably one or more type selected from the group consisting of tetraethylhexanediamine, tetramethylhexanediamine, tetramethylpropanediamine, (2-dimethylaminoethyl)methylethanolamine, tetramethylethylenediamine, dipiperidinoethane, dipyrrolidinoethane, sparteine, and trimethylaminopropylethanolamine; more preferably one or more type selected from the group consisting of tetramethylhexanediamine, tetramethylpropanediamine, and (2-dimethylaminoethyl)methylethanolamine; and even more preferably (2-dimethylaminoethyl)methylethanolamine.

<6> The composition of the agent for treating the precursor of the three-dimensional object according to any one of <1> to <5>, wherein the organic amine compound is preferably one or more type selected from the group consisting of a secondary monoamine compound and a tertiary monoamine compound.

<7> The composition of the agent for treating the precursor of the three-dimensional object according to any one of <1> to <6>, wherein the organic amine compound preferably has an alcoholic hydroxy group.

<8> The composition of the agent for treating the precursor of the three-dimensional object according to any one of <1> to <7>, wherein the number of carbon atoms in the hydrocarbon part in the amine compound is preferably 4 or more, and more preferably 6 or more.

<9> The composition of the agent for treating the precursor of the three-dimensional object according to any one of <1> to <8>, wherein the content of the organic amine compound in the composition of the agent for treating the precursor of the three-dimensional object is preferably 0.5% by mass or more, more preferably 1.0% by mass or more, preferably 20% by mass or less, more preferably 15% by mass or less, further preferably 10% by mass or less, preferably 0.5% by mass to 20% by mass, more preferably 1.0% by mass to 15% by mass, and further preferably 1.0% by mass to 10% by mass.

<10> The composition of the agent for treating the precursor of the three-dimensional object according to any one of <1> to <9>, wherein the alkali metal hydroxide is preferably at least one member selected from the group consisting of lithium hydroxide, sodium hydroxide, and potassium hydroxide.

<11> The composition of the agent for treating the precursor of the three-dimensional object according to any one of <1> to <10>, wherein the alkali metal carbonate is preferably at least one member selected from the group consisting of lithium carbonate, sodium carbonate, and potassium carbonate.

<12> The composition of the agent for treating the precursor of the three-dimensional object according to any one of <1> to <11>, wherein the ratio of the content of the organic amine compound to the total content of the alkali metal hydroxide and the alkali metal carbonate ((Content of the organic amine compound)/(Total content of the alkali metal hydroxide and the alkali metal carbonate)) is preferably less than 033, more preferably less than 0.25, further preferably less than 0.20; and preferably 0 or more and more preferably 0.01 or more.

<13> The composition of the agent for treating the precursor of the three-dimensional object according to any one of <1> to <12>, wherein the total content of the alkali metal hydroxide and the alkali metal carbonate in the composition of the agent for treating the precursor of the three-dimensional object is less than 2.5% by mass, preferably less than 2.0% by mass, more preferably 1.0% by mass, further preferably less than 0.5% by mass; and preferably 0% by mass or more, more preferably 0.01% by mass or more, and further preferably 0.25% by mass or more.

<14> The composition of the agent for treating the precursor of the three-dimensional object according to any one of <1> to <13>, wherein the composition of the agent for treating the precursor of the three-dimensional object preferably contain a surfactant.

<15> The composition of the agent for treating the precursor of the three-dimensional object according to <14>, wherein the content of the surfactant is preferably 10% by mass or less and more preferably 5% by mass or less in the composition of the agent for treating the precursor of the three-dimensional object.

<16> A method for manufacturing a three-dimensional object by a fused deposition modeling system having a modeling step of obtaining a precursor of a three-dimensional object containing a three-dimensional object and a support material containing a (meth)acrylic acid-based copolymer having a hydrophilic monomer and a hydrophobic monomer as a monomer unit and a removing step of contacting the precursor of the three-dimensional object to the composition of the agent for treating the precursor of the three-dimensional object to remove the support material, wherein the composition of the agent for treating the precursor of the three-dimensional object is the composition of the agent for treating the precursor of the three-dimensional object according to any one of <1> to <15>.

<17> The method for manufacturing a three-dimensional object according to <16>, wherein the modeling material a modeling material as a material for the three-dimensional object is preferably at least one member selected from the group consisting of an ABS resin, a polylactic resin, a polycarbonate resin, and a polyphenylsulfone resin, more preferably an ABS resin and/or a polylactic resin, and further preferably an ABS resin.

<18> The method for manufacturing a three-dimensional object according to <16> or <17>, wherein the soluble material for three-dimensional modeling that is a material for the support material preferably contains a (meth)acrylic acid-based copolymer having a hydrophilic monomer and a hydrophobic monomer as a monomer unit.

<19> The method for manufacturing a three-dimensional object according to any one of <16> to <18>, wherein the hydrophilic monomer is preferably one or more type of the hydrophilic monomers selected from the group consisting of acrylic acid, methacrylic acid, diethylaminoethyl acrylate, 2-hydroxyethyl acrylate, 2-hydroxypropyl acrylate, glycidyl acrylate, tetrahydrofurfuryl acrylate, diethylaminoethyl methacrylate, 2-hydroxyethyl methacrylate, 2-hydroxypropyl methacrylate, glycidyl methacrylate, tetrahydrofurfuryl methacrylate, itaconic acid, maleic acid, fumaric acid, and α-hydroxy acrylate, more preferably one or more type of the hydrophilic monomers selected from the group consisting of acrylic acid and methacrylic acid.

<20> The method for manufacturing a three-dimensional object according to any one of <16> to <19>, wherein the hydrophobic monomer preferably one or more type of the hydrophobic monomers selected from the group consisting of methylacrylate, ethylacrylate, propylacrylate, butylacrylate, isobutylacrylate, tertiary butylacrylate, 2-ethylhexylacrylate, octylacrylate, isodecylacrylate, laurylacrylate, tridecylacrylate, cetylacrylate, stearylacrylate, cyclohexylacrylate, benzylacrylate, methylmethacrylate, ethylmethacrylate, propylmethacrylate, butylmethacrylate, isobutylmethacrylate, tertiary butylmethacrylate, 2-ethylhexylmethacrylate, octylmethacrylate, isodecylmethacrylate, laurylmethacrylate, tridecylmethacrylate, cetylmethacrylate, stearylmethacrylate, cyclohexylmethacrylate, benzylmethacrylate, styrene, and α-methylene-γ-valerolactone.

<21> The method for manufacturing a three-dimensional object according to any one of <16> to <20>, wherein the pH of the composition of the agent for treating the precursor of the three-dimensional object is preferably 10 or more, more preferably 11 or more, preferably 14 or less, more preferably 13 or less, preferably 10 to 14, more preferably 10 to 13, and further preferably 11 to 13.

<22> The method for manufacturing a three-dimensional object according to any one of <16> to <21>, wherein the temperature of the composition of the agent for treating the precursor of the three-dimensional object in the support material removing step is preferably 25° C. or higher and more preferably 40° C. or higher, preferably 80° C. or lower and more preferably 70° C. or lower, preferably 25° C. to 80° C. and more preferably 40° C. to 70° C.

<23> Use of the composition according to any one of <1> to <15> as an agent for treating a precursor of the three-dimensional object.

<24> A support material removing method of contacting a precursor of a three-dimensional object containing a support material containing a (meth)acrylic acid-based copolymer having a hydrophilic monomer and a hydrophobic monomer as a monomer unit to the composition of the agent for treating the precursor of the three-dimensional object according to any one of <1> to <15> to remove the support material.

EXAMPLES 1 TO 20 AND COMPARATIVE EXAMPLES 1 TO 4>

[Production of Evaluation Sample I]

A silicon tube with a length of 40 mm and a diameter of 3 mm was filled with a filamentous soluble material for the three-dimensional object with a length of 40 mm and a diameter of 3 mm (methacrylate copolymer manufactured by Stratasys Ltd.; trade name SR-30 (monomer unit: 45% by mass of methacrylic acid, 34% by mass of styrene, and 21% by mass of n-butylacrylate)) to form an evaluation sample I.

[Evaluation Method]

After the mass A of the evaluation sample I was measured, the liquid temperature of 100 mL of the composition of the agent for treating the precursor of the three-dimensional object having the composition described in Table 1 was adjusted to 60° C., the evaluation sample I was soaked in the composition of the agent for treating the precursor of the three-dimensional object without stirring for 20 minutes, the evaluation sample I was taken out of the composition of the agent for treating the precursor of the three-dimensional object, the evaluation sample I was rinsed with 100 mL of ion exchanged water, and the swelling of the support material part of the evaluation sample I was visually evaluated. The evaluation was performed on a scale of one to three as described below. The evaluation results are shown in Table 1.

A: No significant attachment of the support material and no swelling were observed.
B: A slight swelling was partially observed.
C: Swelling was observed with the support material attached.

After the swelling of the support material part of the evaluation sample I was visually evaluated, the evaluation sample I was dried for an hour in the drying oven at 110° C., the mass B of the evaluation sample I after drying was measured, and the elution ratio (%) of the soluble material for three-dimensional modeling was obtained by using the following calculation. The evaluation result is shown in Table 1. The composition of the 3% by mass waterworks in Table 3 is shown in Table 2.

Elution Ratio (%) of the soluble material for three-dimensional modeling=(the mass $B$)/(the mass $A$)×100

TABLE 1

| | Composition of Agent for Treating Precursor of Three-Dimensional Object | | | Elution Ratio (%) of Soluble Material for | Visual |
|---|---|---|---|---|---|
| | Type | Concentration (% by mass) | pH | Three-Dimensional Modeling | Evaluation of Swelling |
| Example 1 | 6-dimethylamino-1-hexanol (trade name: | 3 | 11.7 | 62 | A |
| Example 2 | KAOLIZER No. 25 manufactured by Kao | 5 | 11.9 | 67 | A |
| Example 3 | Corporation) | 7 | 11.9 | 50 | A |
| Example 4 | Dimethylaminoethanol (trade name: 2Mabs manufactured by Nippon Nyukazai Co., Ltd.) | 5 | 11.6 | 76 | A |
| Example 5 | Diethylaminoethanol (trade name: 2A manufactured by Nippon Nyukazai Co., Ltd.) | 5 | 11.8 | 74 | A |
| Example 6 | N,N-dimethylaminoethoxyethanol (trade name: KAOLIZER No. 26 manufactured by Kao Corporation) | 5 | 11.4 | 55 | A |
| Example 7 | N-tert-butyldiethanolamine (trade name: tr-BMEA manufactured by Nippon Nyukazai Co., Ltd.) | 5 | 11.3 | 30 | A |
| Example 8 | N-n-butylethanolamine (trade name: MBM manufactured by Nippon Nyukazai Co., Ltd.) | 5 | 11.8 | 62 | A |
| Example 9 | N-ethyldiethanolamine (trade name: MED manufactured by Nippon Nyukazai Co., Ltd.) | 7 | 11.3 | 55 | A |
| Example 10 | Diisopropanolamine (manufactured | 3 | 11.2 | 30 | A |
| Example 11 | by Mitsui Fine Chemicals, Inc.) | 5 | 11.3 | 50 | A |
| Example 12 | | 7 | 11.4 | 65 | A |
| Example 13 | N-(2-dimethylaminoethyl)-N- | 5 | 11.3 | 50 | A |
| Example 14 | methylethanolamine (trade name: KAOLIZER No. 28 manufactured by Kao Corporation) | 7 | 11.4 | 62 | A |
| Example 15 | N,N,N',N'-tetramethylpropane diamine (trade name: KAOLIZER No. 2 manufactured by Kao Corporation) | 5 | 11.8 | 55 | A |
| Example 16 | N,N,N',N'-tetramethylhexane diamine | 3 | 11.8 | 53 | A |
| Example 17 | (trade name: KAOLIZER No. 1 | 5 | 11.9 | 52 | A |
| Example 18 | manufactured by Kao Corporation) | 7 | 12.0 | 45 | A |
| Example 19 | Hydroxyethylpiperazine (manufactured | 5 | 11.4 | 18 | A |
| Example 20 | by Nippon Nyukazai Co., Ltd.) | 7 | 11.4 | 55 | A |
| Comparative Example 1 | Monoethanolamine | 5 | 11.8 | 40 | C |
| Comparative Example 2 | Monoisopropanolamine (manufactured by Mitsui Fine Chemicals, Inc.) | 5 | 11.7 | 48 | C |

TABLE 1-continued

| | Composition of Agent for Treating Precursor of Three-Dimensional Object | | | Elution Ratio (%) of Soluble Material for Three-Dimensional Modeling | Visual Evaluation of Swelling |
|---|---|---|---|---|---|
| | Type | Concentration (% by mass) | pH | | |
| Comparative Example 3 | | 7 | 11.8 | 37 | C |
| Comparative Example 4 | | 12 | 12.0 | 19 | C |

TABLE 2

3% by Mass Aqueous Solution of Waterworks

| Component | Content (% by mass) |
|---|---|
| Sodium Carbonate | 1.57 |
| Sodium Hydroxide | 0.59 |
| Sodium Sulfate | 0.12 |
| Sodium Dodecyl Sulfate | 0.03 |
| Zeolite | 0.05 |
| Sodium Polyacrylate | 0.06 |
| Water | Residue |

EXAMPLES 21 TO 27 AND COMPARATIVE EXAMPLES 5 AND 6

[Production of Evaluation Sample]

ABS (ABS resin manufactured by Stratasys Ltd.) was used as a modeling material and the SR-30 was used as a soluble material for three-dimensional modeling to form an evaluation sample II (a precursor for the three-dimensional object) by the FDM system 3D printer Fortus 250MC manufactured by Stratasys Ltd. The FIGURE is a schematic drawing of a shape of the evaluation sample II.

The evaluation sample II shown in the FIGURE consists of a precursor for the three-dimensional object consisting of a three-dimensional object 1 and a support material 2. The support material 2 is omitted in the drawing in order to assist in understanding the shape of the three-dimensional object 1. However, the spaces of the three-dimensional object 1 is filled with the support material 2, and the outer appearance of the support material II is one cube.

[Evaluation Method 2]

After the mass C of the evaluation sample II was measured, the evaluation sample II was put in a basket and soaked in 500 ml of the composition of the agent for treating the precursor of the three-dimensional object having the composition described in Table 3 (liquid temperature 60° C.), and the composition was cleaned by stirring with a magnetic stirrer at 400 rpm for 30 minutes. The evaluation sample II was dried for an hour in the drying oven at 110° C., the mass D of the evaluation sample II after drying was measured, and the elution speed (% by mass/min) of the soluble material for three-dimensional modeling was obtained by using the following calculation. The evaluation result was shown in Table 3. The composition of the agent for treating the precursor of the three-dimensional object in Example 27 was 2.5% by mass of 6-dimethylamino-1-hexanol and 0.5% by weight of sodium hydroxide.

Elution Speed (% by mass/min) of Soluble Material for Three-Dimensional Modeling=(mass C−mass D)/(mass C)×100/30

TABLE 3

| | Composition of Agent for Treating Precursor of Three-Dimensional Object | | | Elution Speed (% by mass/min) of Soluble Material for Three-Dimensional Modeling |
|---|---|---|---|---|
| | Type | Concentration (% by mass) | pH | |
| Example 21 | 6-dimethylamino-1-hexanol | 2.5 | 11.8 | 6.2 |
| Example 22 | (trade name: KAOLIZER No. 25 manufactured by Kao Corporation) | 5 | 11.9 | 6.3 |
| Example 23 | Dimethylaminoethanol (trade name: 2Mabs manufactured by Nippon Nyukazai Co., Ltd.) | 5 | 11.6 | 6.3 |
| Example 24 | Diethylaminoethanol (trade name: 2A manufactured by Nippn Nyukazai Co., Ltd.) | 5 | 11.8 | 6.5 |
| Example 25 | N-ethylethanolamine (trade name: MEM manufactured by Nippon Nyukazai Co., Ltd.) | 5 | 11.8 | 1.8 |
| Example 26 | N,N,N',N'-tetramethylhexane diamine (trade name: KAOLIZER No. 1 manufactured by Kao Corporation) | 5 | 11.9 | 6.2 |
| Example 27 | 6-dimethylamino-1-hexanol Sodium Hydroxide | 2.5 0.5 | 12.5 | 2.8 |
| Comparative Example 5 | Waterworks (manufactured by Stratasys Ltd.) | 3 | 13.1 | 0.8 |
| Comparative Example 6 | Monoethanolamine | 5 | 11.8 | 0.6 |

DESCRIPTION OF REFERENCE SIGNS

1 Three-Dimensional Object
2 Support Material

The invention claimed is:

1. A support material removing method comprising:
contacting (a) a precursor of a three-dimensional object containing a support material containing a (meth) acrylic acid-based copolymer having a hydrophilic monomer and a hydrophobic monomer as a monomer unit, with (b) a composition of an agent for treating the precursor of the three-dimensional object to remove the support material;
wherein the composition of the agent for treating the precursor of the three-dimensional object comprises:
at least one or more type of organic amine compounds selected from the group consisting of a secondary monoamine compound, a tertiary monoamine compound, a secondary diamine compound, and a tertiary diamine compound; wherein
a total content of alkali metal hydroxide and alkali metal carbonate is less than a content of the organic amine compound and less than 2.5% by mass.

2. The support material removing method of claim 1, wherein the one or more organic amine compounds include an amine compound having an alcoholic hydroxy group.

3. The support material removing method of claim 2, wherein the secondary monoamine compound is butylethanolamine.

4. The support material removing method of claim 2, wherein the tertiary monoamine compound is at least one selected from the group consisting of dimethylaminoethanol, diethylaminoethanol, ethyldiethanolamine, and 6-dimethylamino-1-hexanol.

5. The support material removing method of claim 2, wherein the secondary diamine compound is hydroxyethylpiperazine.

6. The support material removing method of claim 1, wherein the tertiary diamine compound is at least one selected from the group consisting of tetramethylhexanediamine, tetramethylpropanediamine, and (2-dimethylaminoethyl) methylethanolamine.

7. The support material removing method of claim 1, wherein the content of the one or more organic amine compounds in the composition of the agent for treating the precursor of the three-dimensional object is 0.5-20% by mass.

8. The support material removing method of claim 1, wherein the hydrophilic monomer is methacrylic acid.

9. The support material removing method of claim 1, wherein the hydrophobic monomer is at least one selected from the group consisting of butyl acrylate and styrene.

10. The support material removing method of claim 1, wherein a pH of the composition of the agent for treating the precursor of the three-dimensional object is 10 to 14.

* * * * *